US00RE49436E

(19) United States
(12) Reissued Patent
Zimmerman

(10) Patent Number: US RE49,436 E
(45) Date of Reissued Patent: Feb. 28, 2023

(54) DIRECTIONAL LIGHT MOUNTING SYSTEM

(71) Applicant: Todd Zimmerman, Highland, CA (US)

(72) Inventor: Todd Zimmerman, Highland, CA (US)

(21) Appl. No.: 17/185,871

(22) Filed: Feb. 25, 2021

Related U.S. Patent Documents

Reissue of:
(64) Patent No.: 10,215,386
Issued: Feb. 26, 2019
Appl. No.: 15/854,634
Filed: Dec. 26, 2017

U.S. Applications:
(60) Provisional application No. 62/551,726, filed on Aug. 29, 2017.

(51) Int. Cl.
*F21S 6/00* (2006.01)
*F21V 21/29* (2006.01)
*F21V 21/096* (2006.01)

(52) U.S. Cl.
CPC ..... *F21V 21/29* (2013.01); *F21S 6/006* (2013.01); *F21V 21/096* (2013.01)

(58) Field of Classification Search
CPC ..... F21S 6/00; F21V 21/29; F21V 21/096
See application file for complete search history.

(56) References Cited

U.S. PATENT DOCUMENTS 4,719,549 A * 1/1988 Apel ..... F21S 2/00 362/398
6,416,207 B1 * 7/2002 Chang ..... F21S 6/003 362/249.07
8,900,009 B2 * 12/2014 Hornick ..... F16M 13/022 439/38
10,756,773 B2 * 8/2020 Kovacs ..... H04M 1/04
2007/0014101 A1 * 1/2007 Huang ..... F21V 21/30 362/119
2007/0103917 A1 * 5/2007 Wu ..... F21V 21/0965 362/427
2012/0063152 A1 * 3/2012 Chang ..... F21S 6/006 362/427
2013/0182437 A1 * 7/2013 Sachsenweger ..... F21V 21/096 362/249.01
2015/0131276 A1 * 5/2015 Thompson ..... F21L 4/025 362/191
2019/0162396 A1 * 5/2019 Sonneman ..... F21V 21/30

* cited by examiner

*Primary Examiner* — Deandra M Hughes
(74) *Attorney, Agent, or Firm* — Loza & Loza, LLP; Michael I. Angert

(57) ABSTRACT

A light directing apparatus is disclosed. The light directing apparatus including a light mounting fixture, a ball joint including a ball stud having a round head on a first end and a stud shaft on a second end in which the stud shaft mounted to the light mounting fixture and a magnetic housing magnetically coupling the ball joint and the magnetic housing by a magnetic force of the magnetic housing such that the magnetic housing has a concave mount surface to accommodate the round head of the ball joint therein allowing the ball joint to move freely within the concave opening such that the light mounting fixture is rotatable in a 360 degree range around the ball joint and movable 180 degrees in a latitudinal and a longitudinal direction. The light directing apparatus further includes a moveable arm affixed to the magnetic housing by a sleeve mount.

14 Claims, 7 Drawing Sheets

DIRECTIONAL LIGHT MOUNTING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present disclosure pertains to light mounting and light directional devices. More specifically the present disclosure pertains to light mounting devices that provide rotational movement and mobility.

BACKGROUND

In a product service environment, lighting is critical to conducting efficient and accurate repair of the product. For example, in the automobile industry, dent repair business requires a variety of different lights in various directions to enable to a technician to clearly and easily see and identify the extent of the damage to the automobile exterior. The lights required for such environments must be easy to rotate around the automobile and easily adjustable to produce the required angle and lighting to analyze and repair the damage.

Conventional lighting that provides some adjustability in aiming the light source employ, as shown in FIG. 1, a ball and socket joint 100. As can be seen in FIG. 1, the movement of the ball 102 is limited in movement 106 by the restricted opening 104 which is needed to hold the ball of the ball and socket joint in place.

Therefore, a way is needed to provide the proper lighting that is easily rotational in a large range of motion and mobile in order to properly affect repairs.

SUMMARY OF THE INVENTION

A light directing apparatus is disclosed. The light directing apparatus including a light attached to a light mounting fixture member, a ball joint member including a ball stud having a round head on a first end and a threaded shaft on a second end in which the threaded shaft is mounted to the light mounting fixture and a magnetic housing member magnetically coupling the ball joint member and the magnetic housing by a magnetic force of the magnetic housing such that the magnetic housing has a concave mount surface to accommodate the round head of the ball joint therein allowing the ball joint to move freely within the concave opening such that the light mounting fixture is rotatable in a 360 degree range around the ball joint and movable 180 degrees a latitudinal and a longitudinal direction. The light directing apparatus further includes a moveable arm member affixed to the magnetic housing by a sleeve mount. The light directing apparatus is configured to direct light onto the body of an automobile to enhance detection of dents and scratches therein.

DRAWINGS

Various features, nature, and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific details. For example, structures and techniques may not be shown in detail in order not to obscure the embodiments.

Overview

A first feature provides a way to provide a repair light that is rotatable and moveable to see automobile dents clearly.

The rotatable light mounting fixture includes a ball joint that includes a metal ball stud having a round head provided at the back surface of a light mounting fixture that has a service light attached to it. The service light can be of any size or shape. The ball stud is pivotal about the round head with respect to a concave magnetic housing, and rotatable about a center axis of the ball as well as being free to move laterally and longitudinally.

Embodiments of the Invention

Figure 1:
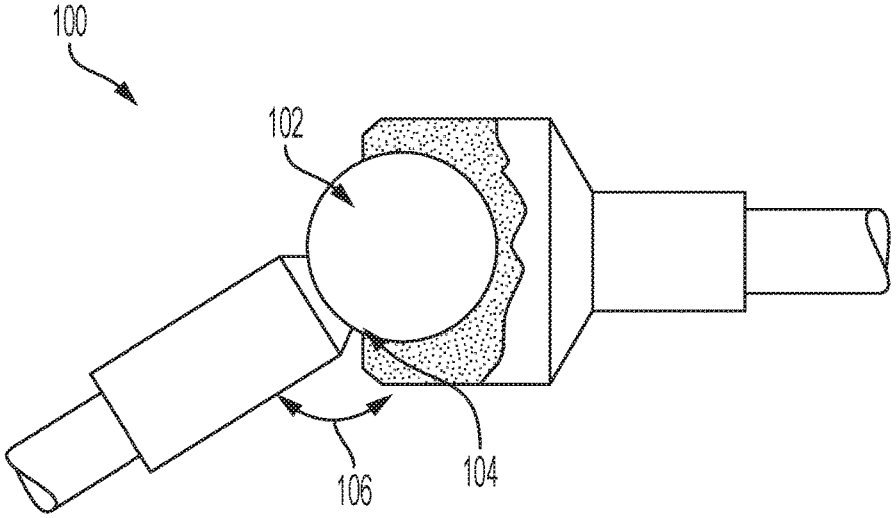
Figure 1 Prior Art
FIG. 1 is an example of a conventional ball and joint system of the prior art.
Figure 2:
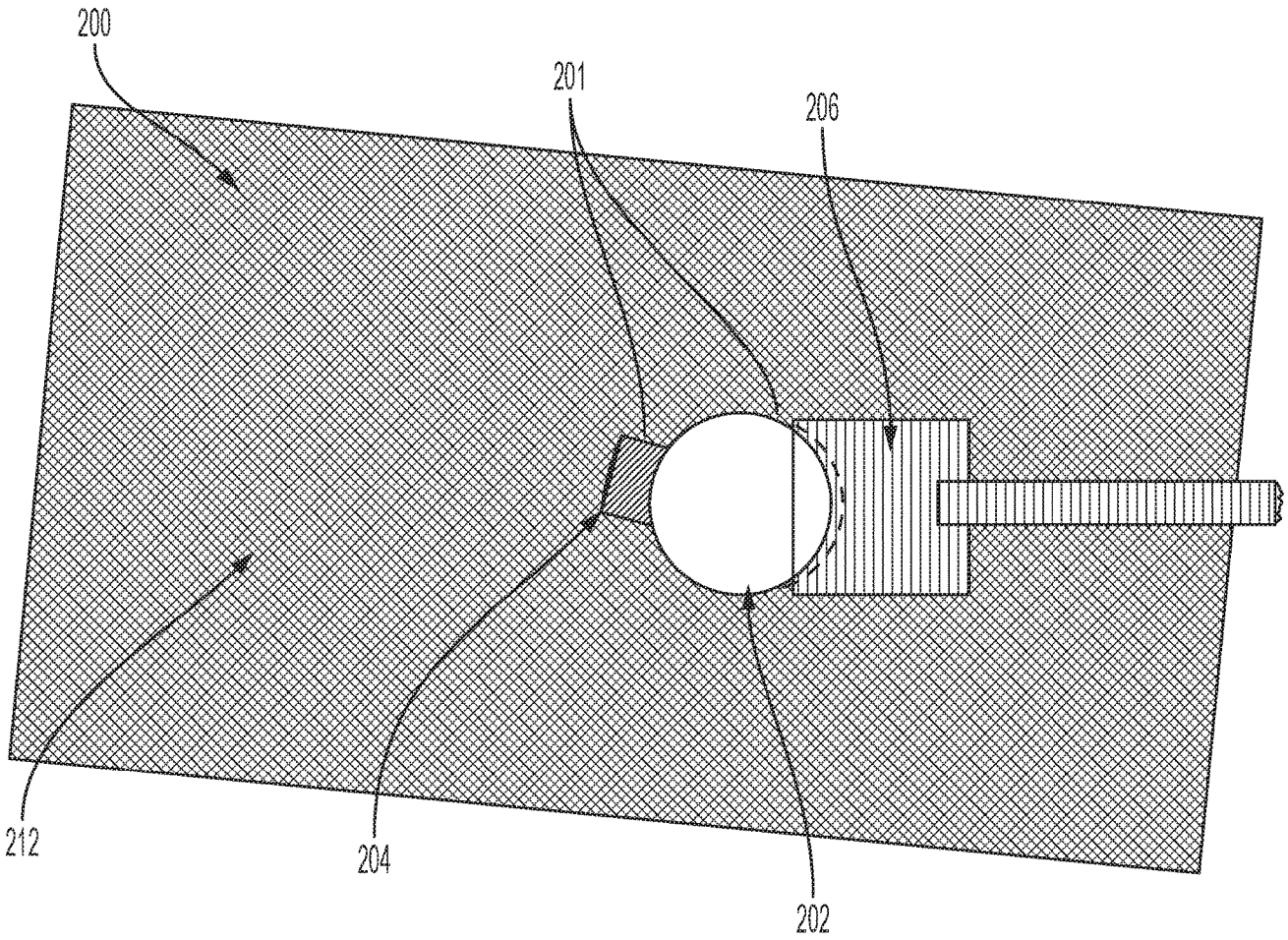
FIG. 2 is an exemplary ball and joint system of the present invention.

FIG. 2 illustrates an exemplary embodiment of the present directional light mounting system. The light mounting system 200 includes a ball stud 201 having a ball member 202 that is in contact with a concave magnetic housing 206 and a threaded shaft or stud member 204 enabled to be screwed into a back of a light housing *via a light mounting fixture* member 212. In some embodiments, the ball member 202 of ball stud 201 may be made of chromed steel. The concave magnetic housing 206 may be made of a rare earth magnet such as neodymium or samarium cobalt, for example. In this manner, the concave magnetic housing 206 maintains contact with the ball stud 201 at the surface of the ball. The magnetic housing 206 and the ball stud 201 can thus be slidably positioned mutual to each other. The ball 202 of ball stud 201 is coupled to the concave magnetic housing 206 through the magnetic force generated by the rare earth permanent magnets of the concave magnetic housing 206. The light [housing back] *mounting fixture member* 212 may thus be rotated 360 degrees with respect to an axis of the shaft stud member 204 of the ball stud 201. In addition, the light [housing back] *mounting fixture member* 212 may be moved 180 degrees laterally or longitudinally with respect to the magnetic housing 206. In this manner, the light enclosed by the light housing [212] may be moved in any direction required to focus light in the manner needed by a technician to enhance the illumination of points of interest on an automobile to more readily reveal dents and scratches for the repair process.

Figure 3:
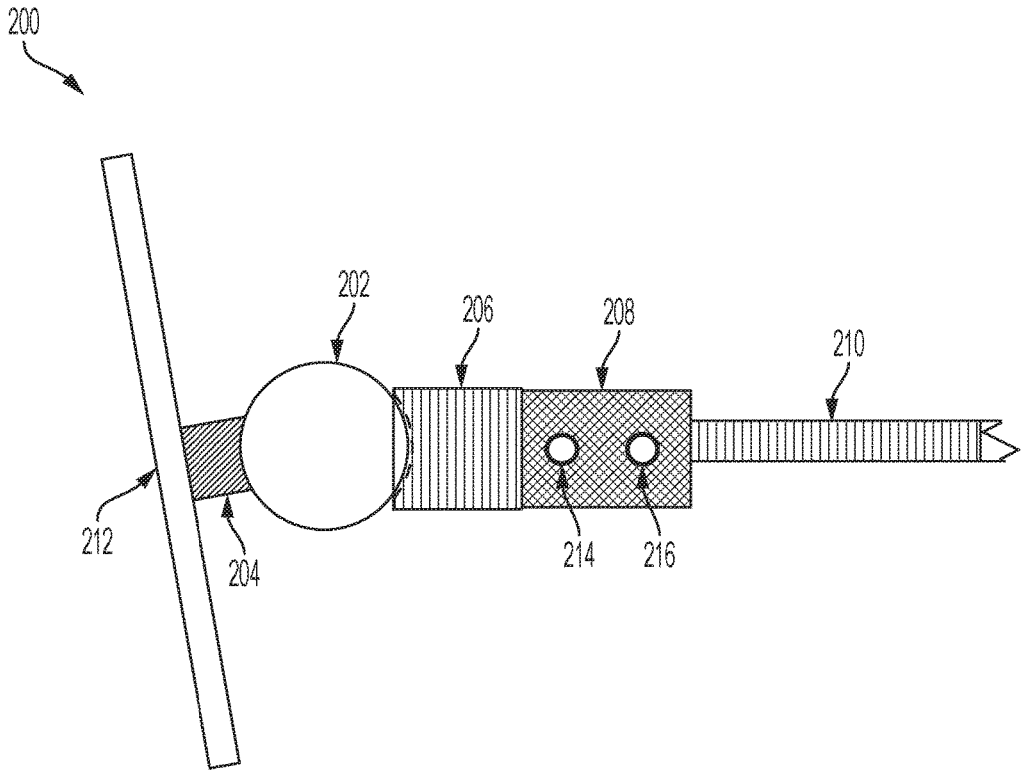
FIG. 3 is an exemplary plan view of a sleeve to attach the directional light mounting system to a stand of the present invention.

FIG. 3 is an exemplary plan view of a sleeve 208 to attach the directional light mounting system 200 to a stand illustrating the connection of the concave magnetic housing 206 to an arm 210 of a stand that may support the light mounting system 200. The concave magnetic housing 206 further includes a shaft member (not shown) at an opposite end from the concave side of the concave magnetic housing 206. A sleeve 208 is attached to a shaft (not shown) of the concave magnetic housing 206 occupying about half of the sleeve's 208 interior and secured with a locking screw 214. The sleeve 208 is additionally attached over the arm 210 of a stand occupying the remainder of the sleeve's 208 interior and secured by a second locking screw 216.

Figure 4:
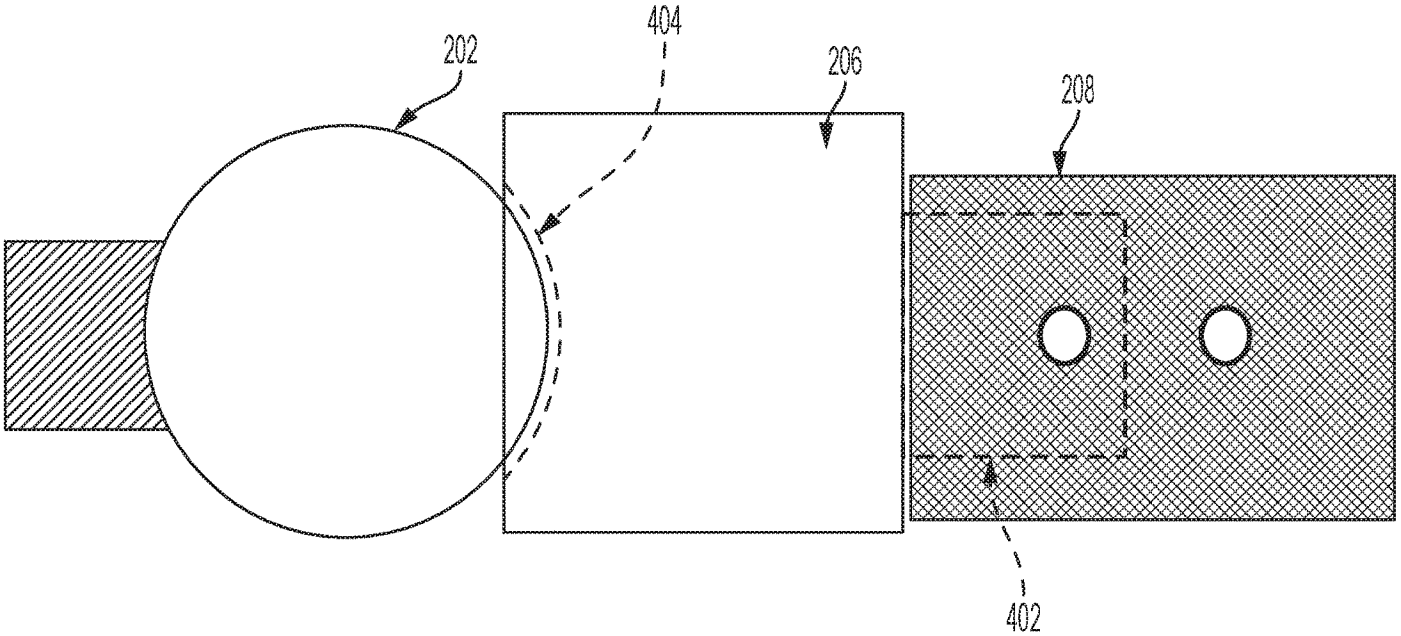
FIG. 4 is an exemplary plan view of a magnetic housing of the present invention.

FIG. 4 is an exemplary plan view of the magnetic housing 206 of the present invention. The concave magnetic housing 206 includes a cylindrical shaft 402. Shaft 402 may be of a sufficient diameter such that the shaft 402 will fit securely in sleeve 208, for example. The magnetic housing 206 includes a concave structure 404 on a first end of the magnetic housing 206. The concave structure 404 may include a diameter such that ball member 202 fits into concave structure 404 in a complementary fashion. The magnetic housing 206 includes the cylindrical shaft 402 on a second end.

Figure 5:
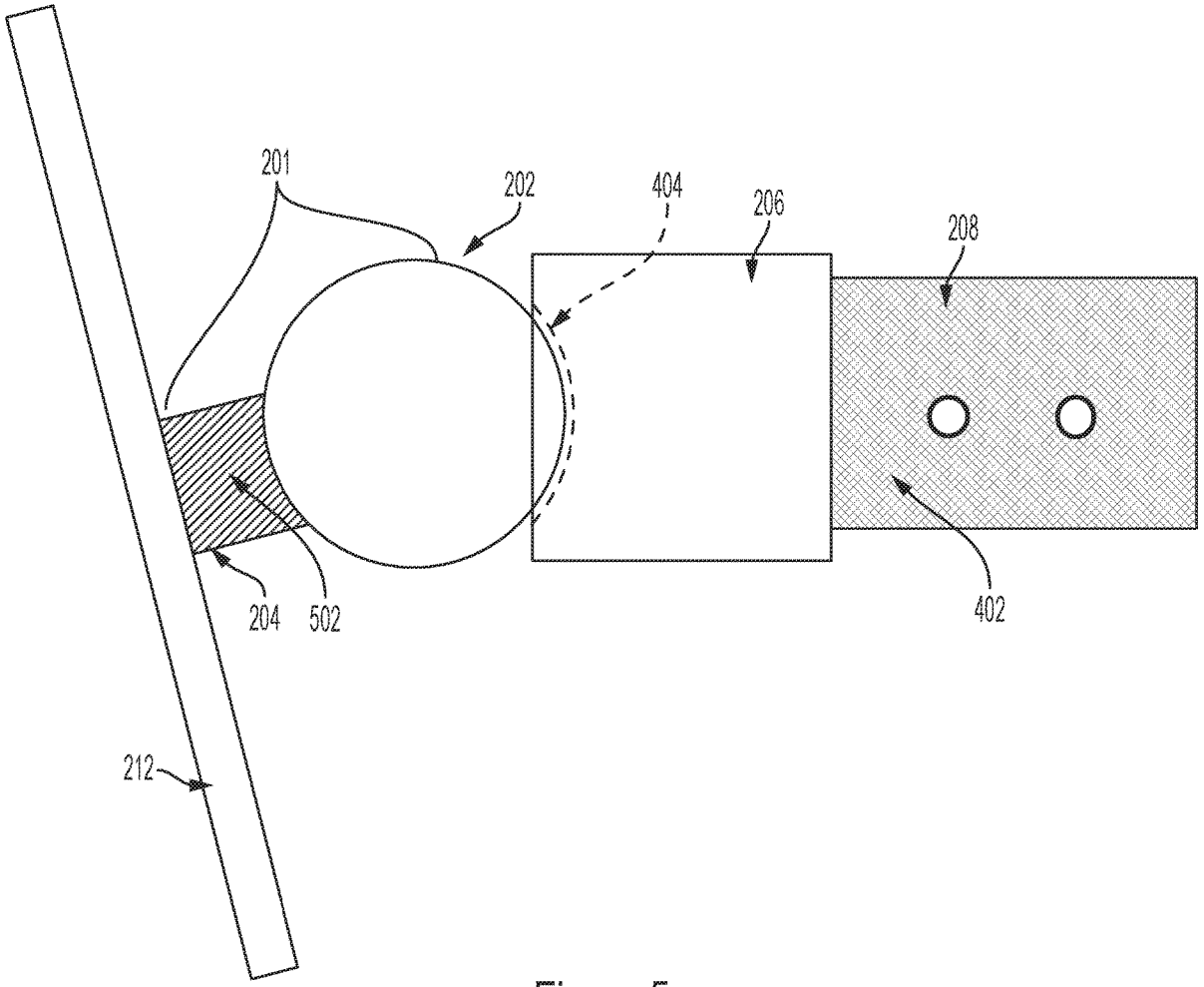
FIG. 5 illustrates an exemplary ball stud to enhance rotation and direction of the present invention.

FIG. 5 illustrates an exemplary ball stud 201 and its movability within magnetic housing 206 in order to direct the light [housing] *mounting fixture member* 212. The ball stud 201 includes a ball member 202 on a first end and a shaft member 204 on a second end. The shaft member 204 may include a threaded structure 502 to enable the ball stud 201 to be secured into the back of [lighting housing] *the light mounting fixture member* 212. The ball member 202 may be of a diameter such that it fits into the concave structure 404 of magnetic housing 206 in a complementary fashion. The light [housing back] *mounting fixture member* 212 may thus be rotated 360 degrees with respect to an axis of the shaft stud member 204 of the ball stud 201 and 180 degrees laterally or longitudinally with respect to the magnetic housing 206. Thus, the ball stud 201 being coupled to the magnetic housing 206 solely through the magnetic force of the magnetic housing 206 enables a much greater range of motion than conventional ball and socket structures providing a repair technician with an improved ability to maneuver a light as required to readily view the serviceable part.

Figure 6:
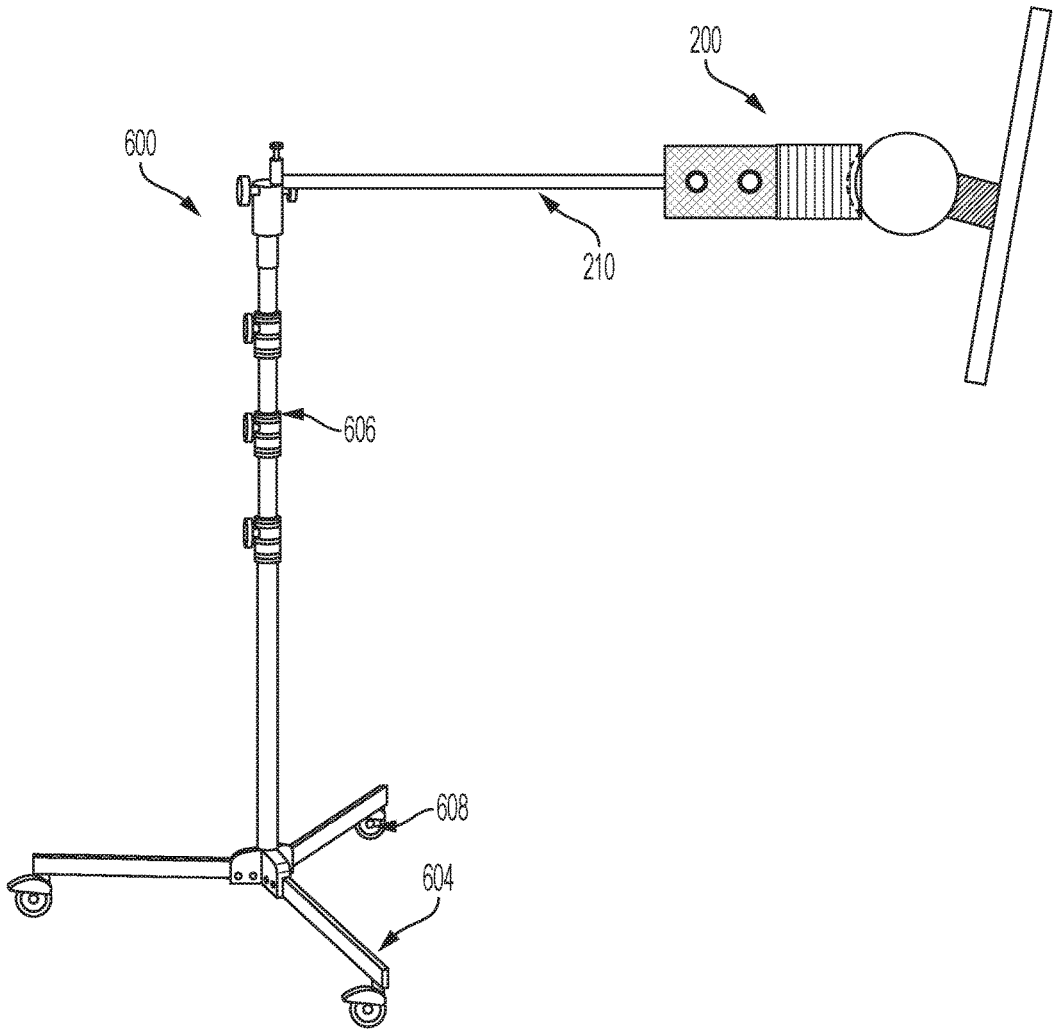
FIG. 6 is an exemplary lighting housing of the present invention.

FIG. 6 is a diagram of an exemplary light stand 600. The light stand 600 may include feet 604 and a central shaft 606. The central shaft 606 may be adjustable in height. Feet 604 may further include wheels 608 to allow mobility of the light stand [602] *600*. The light stand [602] *600* also includes arm 210. The arm 210 may be extendable length wise to allow proper placement of *a* light housing[200]. The [Arm] *arm* 210 may be of a sufficient diameter to allow sleeve 208 to fit securely over the arm 210 and to couple to the magnetic housing 206 shown in FIG. 3, for example.

Figure 7:
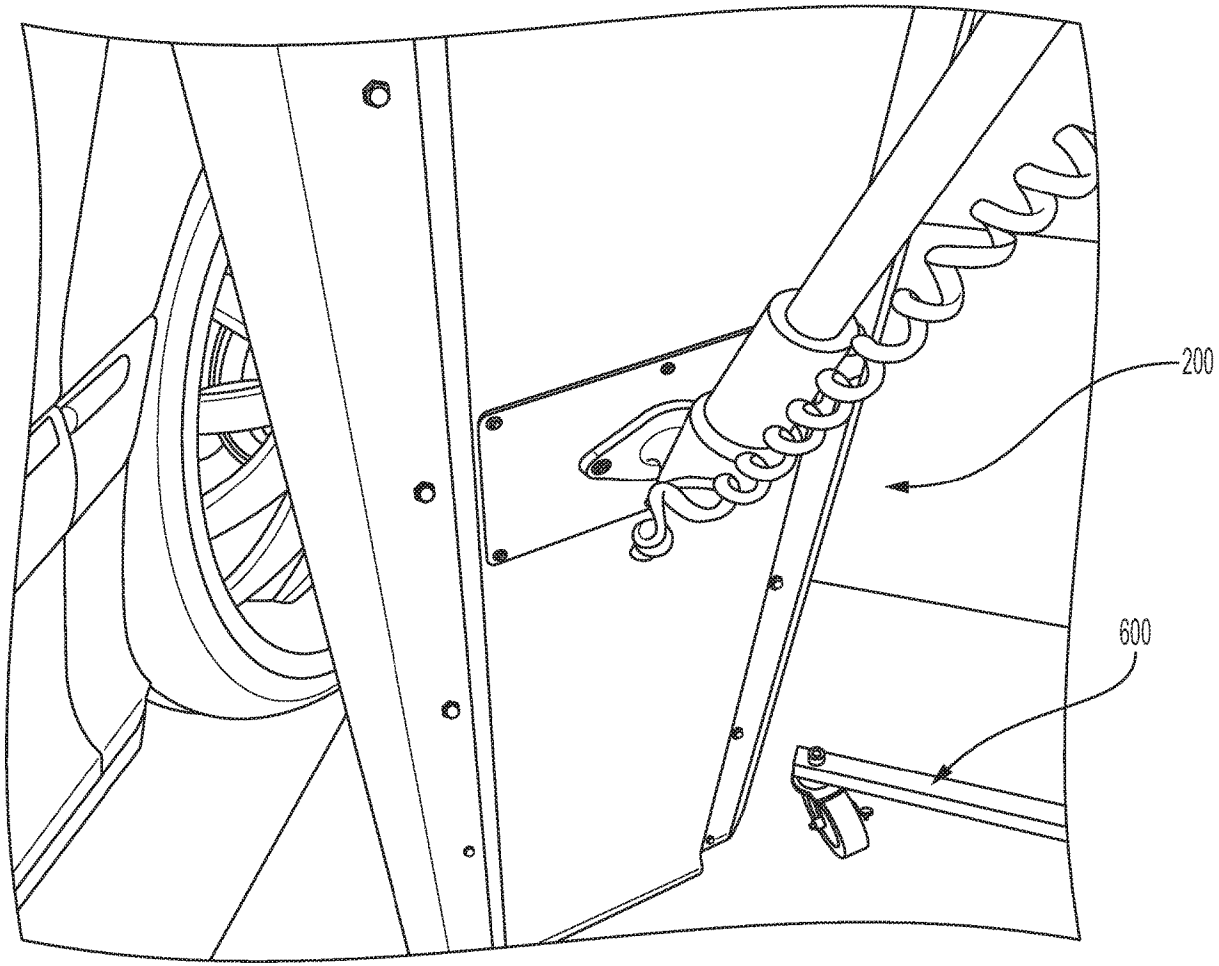
FIG. 7 illustrates an exemplary use of the directional light directing system of the present invention.

FIG. 7 illustrates an exemplary use of the light stand 600 as may be used in examining and repairing a car dent, for example. The light stand 600 is shown adjacent to an automobile in an exemplary embodiment. The directional light mounting system 200, according to the present embodiments, may be movable around the automobile and may be adjusted by height, angle and position by use of the above described directional light mounting system to enhance the illumination of the desired service area.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A light directing apparatus comprising:

a light attached to a light mounting fixture member;

a ball stud member including a ball member having a round head on a first end and a threaded shaft on a second end, the threaded shaft mounted to the light mounting fixture;

a magnetic housing member magnetically coupling the ball member and the magnetic housing by a magnetic force of the magnetic housing, the magnetic housing having a concave mount surface to accommodate the round head of the ball stud therein allowing the ball member to move freely within the concave opening such that the light mounting fixture is rotatable in a 360 degree range around the ball member and movable 180 degrees in a latitudinal and a longitudinal direction; and a moveable arm member affixed to the magnetic housing member, wherein the threaded shaft of the ball stud member is configurable to lie parallel to each surface of a body of an automobile [if the movable arm member is horizontal] and the light directing apparatus is configured to direct light parallel to the each surface of the body of the automobile.

2. The apparatus of claim 1, wherein the magnetic housing or the ball member includes a permanent rare earth magnet.

3. The apparatus of claim 1, wherein the light mounting fixture comprises a plastic, carbon fiber or aluminum mount enabled to accept a lighting device.

4. The apparatus of claim 1, wherein the movable arm is rotatable around a 360 degree horizontal plane and a vertical plane.

5. The apparatus of claim 1, wherein the movable arm member is affixed to the magnetic housing member by a sleeve mount.

6. The apparatus of claim 1, wherein the moveable arm member is further coupled to a movable stand.

7. The apparatus of claim 6, wherein the light is enabled to focus light on any part of the body of the automobile.

8. A service light directing apparatus comprising:

a light mounting fixture member;

a ball joint member including a ball stud having a round head on a first end and a threaded shaft on a second end, the threaded shaft mounted to the light mounting fixture;

a magnetic housing member magnetically coupling the ball joint member and the magnetic housing by a magnetic force of the magnetic housing, the magnetic housing having a concave mount surface to accommodate the round head of the ball stud therein allowing the ball joint to move freely within the concave opening such that the light mounting fixture is rotatable in a 360 degree range around the ball joint and movable 180 degrees in a latitudinal and a longitudinal direction; and a moveable arm member affixed to the magnetic housing member, wherein the threaded shaft of the ball joint member is configurable to lie parallel to each surface of a body of an automobile [if the movable arm member is horizontal] and the service light directing apparatus is configured to direct an illumination of the light parallel to the each surface of the body of the automobile.

9. The apparatus of claim 8, wherein the magnetic housing or the ball member includes a permanent rare earth magnet.

10. The service light apparatus of claim 8, wherein the light mounting fixture comprises a plastic, carbon fiber or aluminum mount enabled to accept a lighting device.

11. The service light apparatus of claim 8, wherein the movable arm is rotatable around a 360 degree horizontal plane and a vertical plane.

12. The service light apparatus of claim 8, wherein the movable arm member is affixed to the magnetic housing member by a sleeve mount.

13. The service light apparatus of claim 8, wherein the moveable arm member is further coupled to a movable stand.

14. The apparatus of claim 13, wherein the light is enabled to focus light on any part of the body of the automobile.

* * * * *